June 6, 1950 G. E. DATH 2,510,277
FRICTION SHOCK ABSORBING MECHANISM
Filed Dec. 12, 1946 3 Sheets-Sheet 2

Inventor:
George E. Dath.
By Henry Fuchs
Atty.

June 6, 1950          G. E. DATH          2,510,277
FRICTION SHOCK ABSORBING MECHANISM
Filed Dec. 12, 1946          3 Sheets-Sheet 3
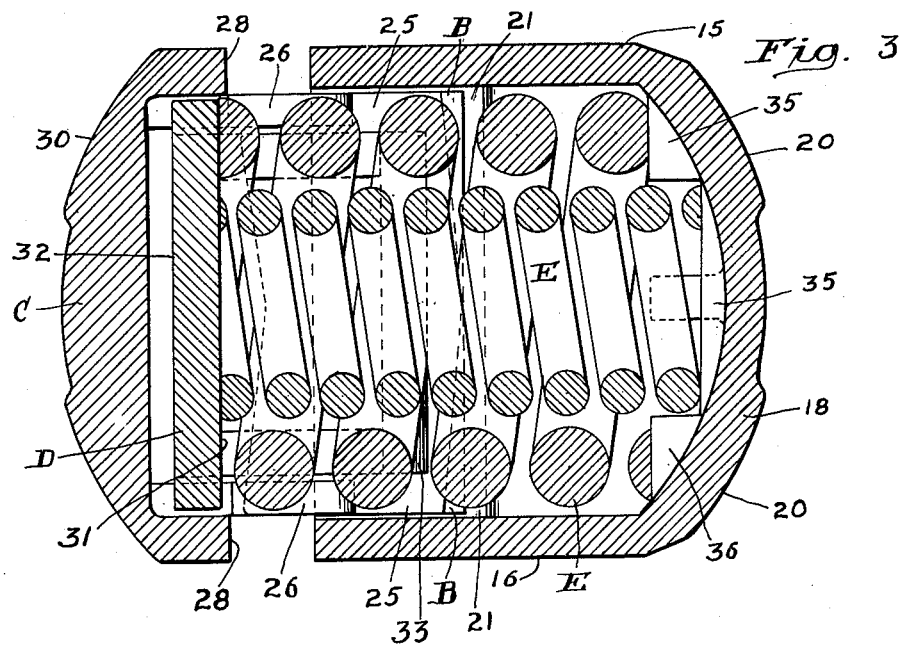
Inventor:
George E. Dath.
By Henry Fuchs.
Atty.

Patented June 6, 1950

2,510,277

UNITED STATES PATENT OFFICE 2,510,277

FRICTION SHOCK ABSORBING MECHANISM

George E. Dath, Mokena, Ill., assignor to W. H. Miner, Inc., Chicago, Ill., a corporation of Delaware Application December 12, 1946, Serial No. 715,756

3 Claims. (Cl. 213—32)

This invention relates to improvements in friction shock absorbing mechanisms particularly adapted for draft riggings of railway locomotives and cars.

One object of the invention is to provide a friction shock absorbing mechanism especially adapted for railway draft riggings having relatively short pockets for accommodating the mechanism.

A further object of the invention is to provide a friction shock absorbing mechanism particularly adapted for a relatively short draft rigging pocket, including a friction casing, friction shoes slidingly telescoped within the casing, a pressure transmitting wedge for wedging the shoes apart into tight frictional engagement with the casing and forcing the same inwardly along said friction surfaces, and springs yieldingly opposing movement of the shoes inwardly of the casing, wherein the parts of the mechanism are arranged and designed in such a manner as to make possible the use of maximum length springs, thereby adding considerably to the shock absorbing capacity and smooth action of the device.

Other objects of the invention will more clearly appear from the description and claims hereinafter following.

Figure 1:
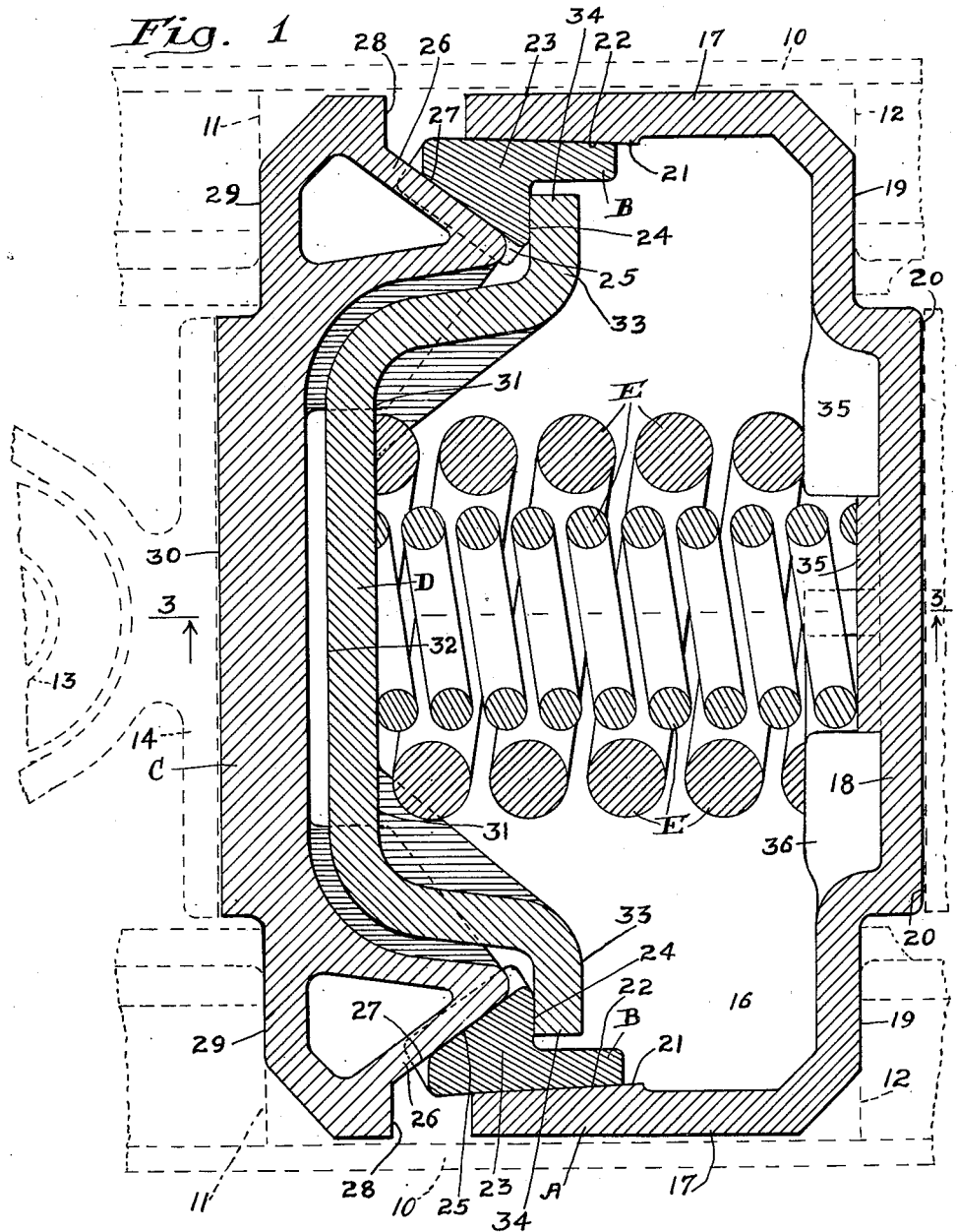
Figure 2:
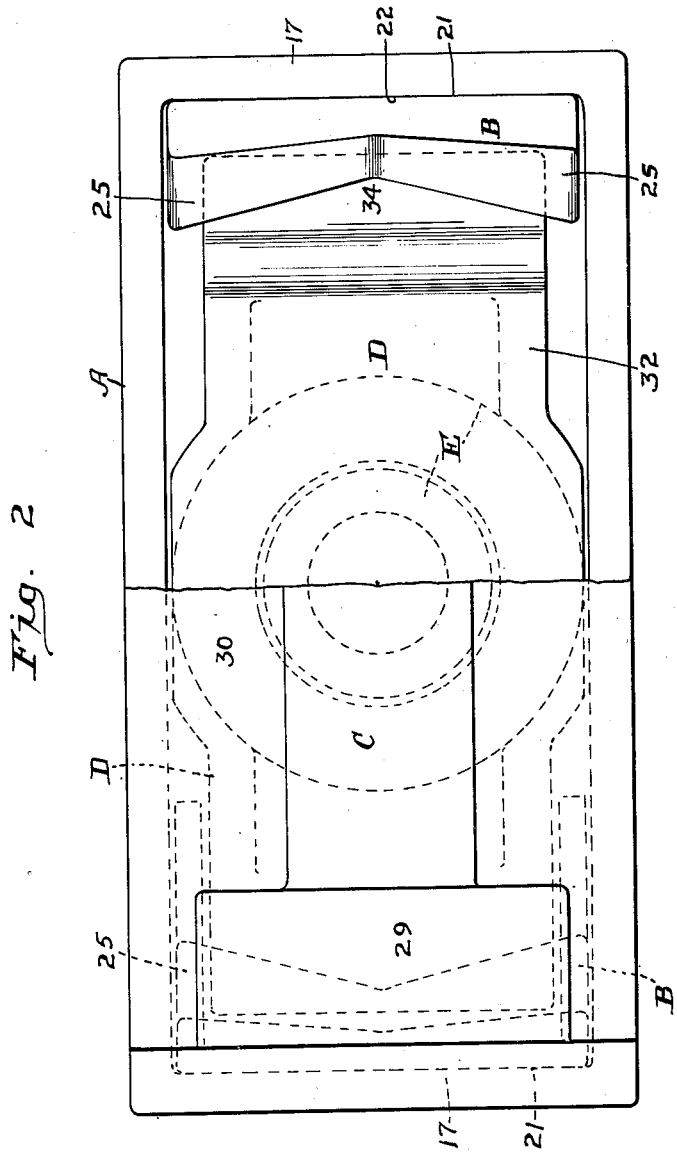

In the accompanying drawings forming a part of this specification, Figure 1 is a horizontal sectional view of my improved friction shock absorbing mechanism, showing the same in applied position, a portion of the draft gear pocket and a portion of the yoke of the draft rigging being shown in dotted lines. Figure 2 is a front elevational view, looking from left to right in Figure 1, with the wedge member partly broken away to more clearly disclose the interior construction of the mechanism. Figure 3 is a longitudinal, vertical sectional view, corresponding substantially to the line 3—3 of Figure 1.

My improved friction shock absorbing mechanism, as illustrated in the drawings, comprises broadly a friction casing A, a pair of friction shoes B—B, a wedge member C, a spring follower D, and spring resistance means E.

The improved friction shock absorbing mechanism is contained in the usual draft gear pocket of the underframe structure of a railway locomotive or car, a portion of such an underframe structure being shown in dotted lines in Figure 1, and indicated by 10. The underframe structure 10 is of the type usually employed in locomotives and presents front and rear stop shoulders or lugs 11—11 and 12—12. The rear end portion of the usual coupler shank, shown in dotted lines, is indicated by 13, to which is operatively connected a yoke 14 of well known construction, also shown in dotted lines. The yoke 14 supports the improved shock absorbing mechanism within the draft gear pocket between the front and rear stop lugs 11—11 and 12—12 and transmits the draft and buffing forces thereto.

The friction casing A of my improved friction shock absorbing mechanism is in the form of a rectangular boxlike member open at its front end and having spaced, horizontally disposed, top and bottom walls 15 and 16, spaced, vertical side walls 17—17, and a transverse rear wall 18. The rear wall 18 presents substantially flat, vertical abutment faces 19—19 on the outer side at opposite sides thereof adapted to cooperate with the rear stop lugs 12—12, and a rounded rear surface 20 therebetween which cooperates with the rear end member of the yoke, which is correspondingly rounded to swivel thereon. The opposed side walls of the casing are provided with substantially flat, interior friction surfaces 21—21, which extend lengthwise of the casing and converge inwardly.

The friction shoes B are two in number and are disposed at opposite sides of the mechanism, having lengthwise extending, flat friction surfaces 22—22 on their outer sides engaging the friction surfaces 21—21 of the casing. Each shoe is laterally inwardly enlarged at the forward end portion thereof, as indicated at 23, thus providing a transversely extending abutment face 24 on said shoe at the rear end of said enlargement. The enlargement 23 of each shoe is provided with a wedge face 25 on the inner side thereof, which is of V-shaped, transverse section. The wedge faces 25—25 of the two shoes converge inwardly of the mechanism.

The wedge member C is in the form of a relatively heavy, substantially rectangular plate, having rearwardly extending wedge projections 26—26 at opposite sides thereof provided with wedge faces 27—27 of V-shaped, transverse section, correspondingly inclined to and engaging respectively with the V-shaped wedge faces 25—25 of the shoes. The plate portion of the wedge member C is extended outwardly beyond the wedge projections 26 to overlap the top and bottom walls 15 and 16 and the side walls 17—17 of the casing, and presents a flat, peripheral abutment face 28 adapted to engage the outer ends of the walls 15, 16, and 17—17 to limit inward movement of the wedge member. The forward side of the platelike wedge member, which member functions as a front follower, presents substantially flat, vertically disposed abutment faces 29—29 at opposite sides thereof cooperating with the front stop lugs 11—11. The front surface of the platelike wedge member C between the faces 29—29 is rounded, as indicated at 30, to fit the vertical front end member of the yoke.

The spring follower D is in the form of a substantially rectangular plate, bowed forwardly between its ends, thus providing a forwardly offset section 31 extending into the space between the wedge projections 26—26 of the wedge member. The offset section 31 of the spring follower D comprises a front, transverse wall 32 and spaced, rearwardly extending side walls 33—33. At the rear end, the spring follower D presents laterally projecting flanges 34—34 at opposite sides thereof, extending outwardly from the rear ends of the side walls 33—33 and engaging in back of the abutment faces 24—24 of the shoes B—B.

The spring resistance E comprises a relatively light inner coil and a heavier outer coil, disposed within the casing A and interposed between the spring follower D and the rear wall of the casing, the front ends of the springs extending into the forwardly offset portion 31 of the spring follower D and bearing on the front wall 32 thereof. The rear end of the inner coil of the spring means bears on shallow ribs 35 on the inner side of the rear end wall 18 of the casing, and the rear end of the outer coil bears on a second set of abutment ribs 36 projecting from said rear wall and disposed about the central coil of the spring. As will be evident, the offset arrangement of the spring follower provides additional space for the spring means of the mechanism, thus making possible the use of relatively longer spring members, which add greatly to the efficiency of the device.

The operation of my improved friction shock absorbing mechanism is as follows: Upon outward movement of the coupler in draft, the yoke pulls the casing A forwardly compressing the mechanism against the front stop lugs 11—11 and forcing the wedge C inwardly of the casing, the wedge being held stationary by the front stop lugs. In buff, the coupler is moved inwardly, carrying the yoke therewith and compressing the mechanism against the rear stop lugs 12—12, the wedge C being forced rearwardly into the casing by the yoke and the casing being held against rearward movement by the rear stop lugs 12—12. As the wedge C moves inwardly of the casing in either draft or buff, the wedge faces thereof wedge the shoes apart and also force the same rearwardly of the casing against the resistance of the spring means E. High frictional resistance is thus produced. Compression of the mechanism continues until inward movement of the wedge C is limited by engagement of the abutment face 28 thereof with the front end of the casing, thereby preventing over compression of the springs. When the actuating force is reduced, the spring means returns all of the parts of the mechanism to the normal position shown in Figures 1 and 2.

I claim:

1. In a friction shock absorbing mechanism, the combination with a friction casing having interior friction surfaces; of friction shoes slidingly engaged with the friction surfaces of the casing; an inwardly movable wedge member having wedge faces engaging said shoes, said wedge member being recessed between said faces; a spring follower bearing on said shoes and having an offset section extending into the recess of said wedge member; and spring means within the casing opposing inward movement of said spring follower, said spring means extending into the offset section of said spring follower.

2. In a friction shock absorbing mechanism, the combination with a friction casing having interior friction surfaces at opposite sides thereof; of friction shoes at opposite sides of the mechanism slidably engaging said friction surfaces; an inwardly movable wedge member having laterally spaced, rearwardly extending wedge projections thereon in wedging engagement with said shoes respectively; a spring follower bearing on the inner ends of said shoes and having an outwardly offset section between said shoes extending into the space between the wedge projections of the wedge member; and spring means within the casing yieldingly opposing inward movement of the spring follower, said spring means extending into the outwardly offset section of the spring follower.

3. In a friction shock absorbing mechanism, the combination with a friction casing; of friction shoes at opposite sides of the casing in sliding frictional engagement with the interior side walls thereof, said shoes having transverse abutment shoulders at the rear end portions thereof; an inwardly movable, rearwardly extending wedge element in wedging engagement with each shoe, said wedge elements being rigidly united at their forward ends by a transverse plate member spanning the space between said elements; a spring follower having a forwardly bowed, central portion and laterally extending flanges engaged in back of the abutment shoulders of the shoes, said bowed portion being forwardly offset and extending between said wedge elements; and spring means within the casing yieldingly opposing inward movement of the spring follower, said spring means having its front end seated in the forwardly offset bowed portion of said spring follower.

GEORGE E. DATH.

REFERENCES CITED

The following references are of record in the file of this patent:

UNITED STATES PATENTS

| Number | Name | Date |
|--------|------|------|
| 677,272 | Ritter | June 25, 1901 |